United States Patent

Wójtowicz

[11] Patent Number: 6,123,336
[45] Date of Patent: Sep. 26, 2000

[54] SEALING DEVICE AND METHOD OF SEALING

[76] Inventor: Janusz B. Wójtowicz, 220 Ventura Ave., Apt. 12A, Palo Alto, Calif. 94306

[21] Appl. No.: 08/863,764

[22] Filed: May 27, 1997

[51] Int. Cl.[7] .............................. F16J 15/10; F16L 17/00
[52] U.S. Cl. ...................... 277/314; 277/316; 277/616; 277/627; 277/630
[58] Field of Search ..................................... 277/314, 316, 277/606, 616, 627, 630, 634, 637, 650

[56] References Cited

U.S. PATENT DOCUMENTS

| | | |
|---|---|---|
| 3,441,662 | 4/1969 | Augenstein et al. . |
| 4,061,344 | 12/1977 | Bradley et al. . |
| 4,375,290 | 3/1983 | Zucchi et al. . |
| 4,600,261 | 7/1986 | Debbaut ............................. 339/116 C |
| 4,634,207 | 1/1987 | Debbaut . |
| 4,662,692 | 5/1987 | Uken et al. ................................. 339/96 |
| 4,690,831 | 9/1987 | Uken et al. ................................. 427/44 |
| 4,716,183 | 12/1987 | Gamarra et al. ......................... 522/80 |
| 4,777,063 | 10/1988 | Dubrow et al. . |
| 4,849,048 | 7/1989 | Inagaki et al. . |
| 4,852,646 | 8/1989 | Dittmer et al. ......................... 165/185 |
| 4,864,725 | 9/1989 | Debbaut .................................... 29/871 |
| 4,865,905 | 9/1989 | Uken ...................................... 428/220 |
| 4,875,870 | 10/1989 | Hardy et al. ............................ 439/204 |
| 5,079,300 | 1/1992 | Dubrow et al. ......................... 525/106 |
| 5,104,930 | 4/1992 | Rinde et al. ............................ 524/871 |
| 5,140,746 | 8/1992 | Debbaut . |
| 5,227,139 | 7/1993 | Wong . |
| 5,235,138 | 8/1993 | Shan et al. . |
| 5,357,057 | 10/1994 | Debbaut . |
| 5,418,001 | 5/1995 | Uken ........................................ 427/58 |
| 5,562,295 | 10/1996 | Wambeke et al. . |
| 5,567,173 | 10/1996 | Franckx . |
| 5,588,856 | 12/1996 | Collins et al. ......................... 439/204 |
| 5,607,167 | 3/1997 | Franckx . |
| 5,626,489 | 5/1997 | Marshall et al. . |
| 5,697,194 | 12/1997 | Gignac et al. . |
| 5,700,012 | 12/1997 | Froehlich et al. . |

FOREIGN PATENT DOCUMENTS

| | | | |
|---|---|---|---|
| WO86/01634 | 3/1986 | WIPO | .............................. H01B 7/18 |
| WO88/00603 | 1/1988 | WIPO | .............................. C08L 53/02 |

*Primary Examiner*—Anthony Knight
*Assistant Examiner*—John L. Beres

[57] ABSTRACT

A sealing device (20) includes a layer of sealant (22) for sealing an internal surface (30) of a hollow member (34). The internal surface is nonparallel to the open end of the hollow member, and has an aperture pattern (44) for receiving at least one substrate (40) extending from a support surface across the hollow member. The layer of sealant is disposed adjacent the internal surface and supported by a backing (24) having an aperture pattern corresponding to the aperture pattern of the internal surface. The backing is spaced from the support surface and is movably supported inside the hollow member. The layer of sealant is adhered to the front surface of the backing to form a self-supporting article that can be easily positioned into the hollow member. One or more substrates can be inserted through the support surface across the hollow member, through the apertures in the backing and the layer of sealant, and through the apertures on the internal surface. To seal the internal surface and the substrates, a compression member is interposed between the support surface and the low friction rear surface of the backing. The compression member is generally noncompressible and is sized to apply generally uniform pressure on the backing and layer of sealant in sealing contact against the internal surface. The compression member includes an array of tooth-like cutouts that match the aperture pattern of the internal surface so that the compression member will not damage or otherwise interfere with the substrates during insertion and removal.

20 Claims, 6 Drawing Sheets

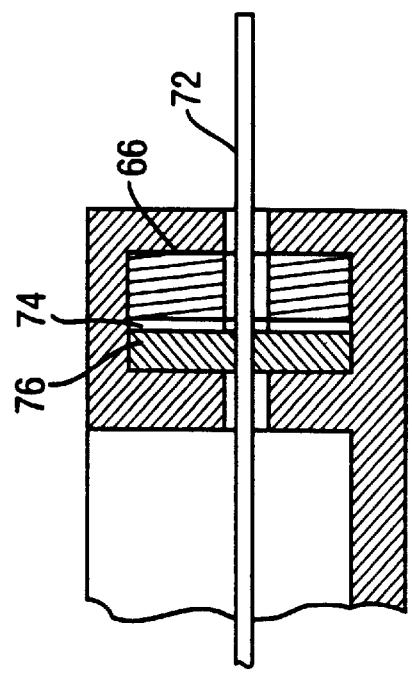
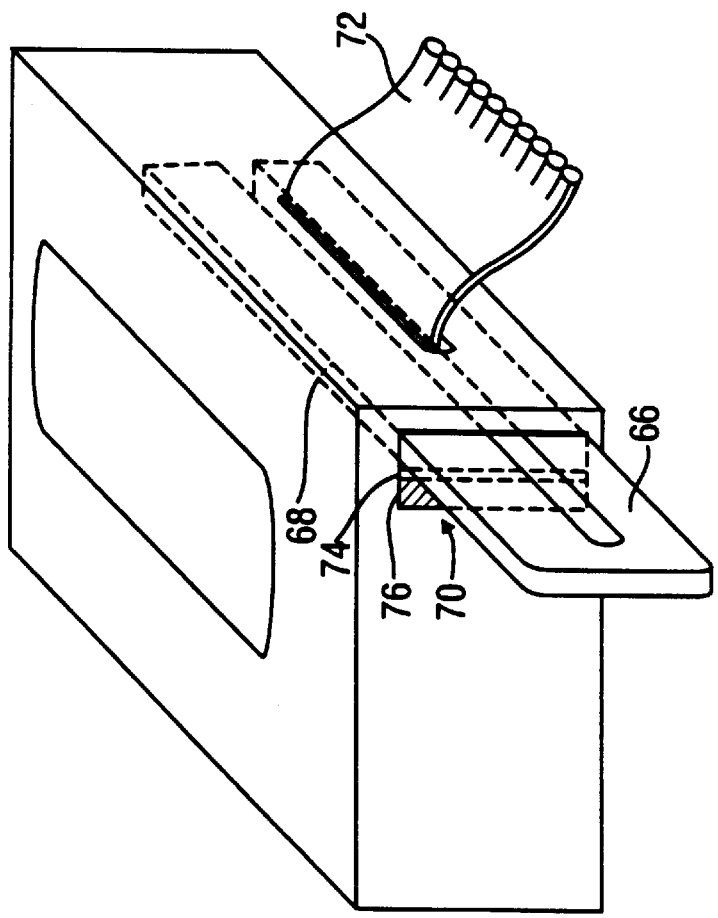
FIG. 6B
FIG. 6A

SEALING DEVICE AND METHOD OF SEALING

FIELD OF THE INVENTION

This invention relates generally to sealing devices and methods of sealing and, more particularly, to devices and methods of sealing wires or contact pins entering a connector.

BACKGROUND OF THE INVENTION

Sealing members have been used to isolate and protect areas, substrates, and enclosures from environmental effects or other external influences. Such sealing members have been used in various applications, including the sealing of wires or contact pins or other components entering a connector for electronic devices to prevent contamination and damage to the electronics or other sensitive components.

Known methods of sealing wires or contact pins include the use of grommets or similar compression seals, heat shrinkable sealing sleeves, and articles containing greases. The use of greases presents difficulties because greases lack any type of three-dimensional structural network. Instead, greases are viscous and flow when subjected to temperature and humidity cycling, making articles of greases relatively unstable for sealing the wires or contact pins. The use of greases also renders inspection or repair difficult since greases, once applied, are difficult to remove. Other methods of sealing employ epoxies and other adhesives, but they are disadvantageous in that reentry of the wires or contact pins is difficult.

U.S. Pat. No. 4,662,692 to Uken et al. describes a method of using a layer of gel to seal contact pins. The gel is surrounded on its sides, but not on either face, by a container for ease of handling. Subsequent to being cured, the gel is disposed adjacent a terminal block usable for connecting the electrical contact pins with the block, and such that an opposite exposed face of the gel is not covered by the container which allows the electrical contact pins to be inserted there through so as to pierce through the gel and therefore be capable of making contact on the block side of the gel.

U.S. Pat. No. 4,875,870 to Hardy et al. provides an improved article of the type disclosed by Uken et al. for sealing a multiconductor connector in which the gel container is provided with special securement means to improve the compression on the gel and hence improve the performance of the seal. It also discloses articles suitable for sealing to contact wires and/or pins entering a connector. One such article uses a layer of gel supported in a container along its edges and by a base on its back surface. The front surface of the layer of gel faces the connector, and the container can be moved relative to the connector to compress the gel between its front surface and back surface to seal the connector. In another embodiment, holes for the pins and/or wires are preformed in the layer of gel so that the gel is not deleteriously damaged during insertion of the pins and/or wires. When the gel is subjected to compression, the preformed holes in the layer of gel seal up against the wires trailing from the contact pins.

It has now been discovered that a more robust method of applying and compressing the gel without the use of the container may be advantageously adapted to a wider range of applications.

SUMMARY OF THE INVENTION

In some applications, due to the configuration or orientation of the components that need to be sealed, prior methods of sealing cannot be satisfactorily utilized to achieve the desired result. There is a need for a more efficient and robust device and method for sealing components such as wires at wire entry locations.

It is a feature of this invention to provide a device for sealing a surface of a hollow member and substrates of various configurations and orientations.

It is another feature of the invention to provide a self-supporting sealing member for sealing a surface of a hollow member.

It is another feature of this invention to provide a compression member supported in a hollow member to exert a generally uniform pressure on a sealant in sealing contact with a surface of the hollow member and substrates to be sealed.

It is yet another feature of this invention to provide a robust sealing device that permits release of the sealing pressure in the sealant to manipulate the substrate without damaging the sealant and reapplication of the sealing pressure on the sealant.

In accordance with one aspect of the present invention, a device for sealing an inner entry surface of a cavity and at least one substrate extending from an inner exit surface of the cavity across the cavity through the inner entry surface comprises a layer of sealant disposed adjacent the inner entry surface. A backing is movably supported in the cavity and spaced from the inner exit surface. The backing is disposed adjacent the layer of sealant. The backing includes at least one opening through which the at least one substrate extends. A compression member is insertable into the cavity between the backing and the inner exit surface and includes at least one cutout which fits over the at least one substrate during insertion of the compression member. The backing moves toward the inner entry surface and compresses the layer of sealant against the inner entry surface upon insertion of the compression member into the cavity.

In accordance with another aspect of the invention, a sealing assembly for sealing an internal surface of a hollow member having an aperture pattern for receiving at least one substrate extending across the hollow member and oriented nonparallel to an open end of the hollow member comprises a sealing member. The sealing member has a layer of sealant supported on a support which includes an aperture pattern corresponding to the aperture pattern of the internal surface. The layer of sealant is disposed between the support and the internal surface. A means is insertable through the open end of the hollow member for applying force to the support to maintain the layer of sealant in sealing contact with the internal surface.

Another aspect of this invention is a preformed sealing member for sealing an internal surface skewed relative to an open end of a hollow member. The preformed sealing member comprises a self-supporting article having a layer of sealant with a contact surface adhered to a front surface of a sealant support. The front surface of the sealant support is larger in area than the contact surface of the layer of sealant.

Yet another aspect of this invention is a method of sealing an ingress wall surface of a cavity and at least one substrate extending from an egress wall surface of the cavity across the cavity through at least one hole in the ingress wall surface comprising the following steps. A layer of sealant is applied on a surface of a backing, which has at least one aperture, to form a sealing article. The sealing article is positioned inside the cavity with the layer of sealant adjacent the ingress wall surface and the at least one aperture generally aligned with the at least one hole in the ingress wall surface. The at least one substrate is inserted from the egress wall surface through the at least one aperture, the layer of sealant, and the at least one hole in the ingress wall surface. A pressure member is interposed between the egress wall surface and the backing to apply pressure on the layer of sealant in sealing contact against the ingress wall surface.

In accordance with another aspect of the invention, a device for sealing a side of a box includes an entry surface for receiving at least one substrate extending through the entry surface. A hinged cover closes a face of the box adjacent to the side of the box including the entry surface. A layer of sealant is disposed adjacent the entry surface. A backing is supported by the box against the layer of sealant. The backing substantially constrains the border of the layer of sealant. A force member is attached to the hinged cover and extends over the side of the box including the entry surface. The force member engages the backing to press against the layer of sealant with the hinged cover in a closed position and disengaged from the backing with the hinged cover in an open position.

In accordance with yet another aspect of the present invention, a device for sealing an inner entry surface of a cavity and at least one substrate extending from an inner exit surface of an external wall, which partly defines the cavity, across the cavity through the inner entry surface comprises a layer of sealant disposed adjacent the inner entry surface. A backing is movably supported in the cavity and spaced from the inner exit surface. The backing is disposed adjacent the layer of sealant. The backing includes at least one opening through which the at least one substrate extends. A force member is mountable on the external wall and has at least one leg extending through at least one hole in the external wall and pushing against the backing and the layer of sealant in sealing contact with the inner entry surface.

BRIEF DESCRIPTION OF THE DRAWINGS

The preferred embodiments of this invention, illustrating all their features, will now be discussed in detail. These embodiments depict the novel and nonobvious sealing device and method of sealing of this invention shown in the accompanying drawings, which are included for illustrative purposes only. These drawings include the following figures, with like numerals indicating like parts:

FIG. 6a is a perspective view illustrating another embodiment of the sealing device utilizing another embodiment of a compression member.

FIG. 6b a cross-sectional view of the sealing device of FIG. 6a.

FIG. 7b is a cross-sectional view illustrating the sealing member of the sealing device of FIG. 7a.

DETAILED DESCRIPTION OF THE INVENTION

The sealing device and method of sealing of this invention may be used for various applications, and are particularly adaptable to sealing components of different configurations. Only a few of these applications are discussed herein.

Figure 1:
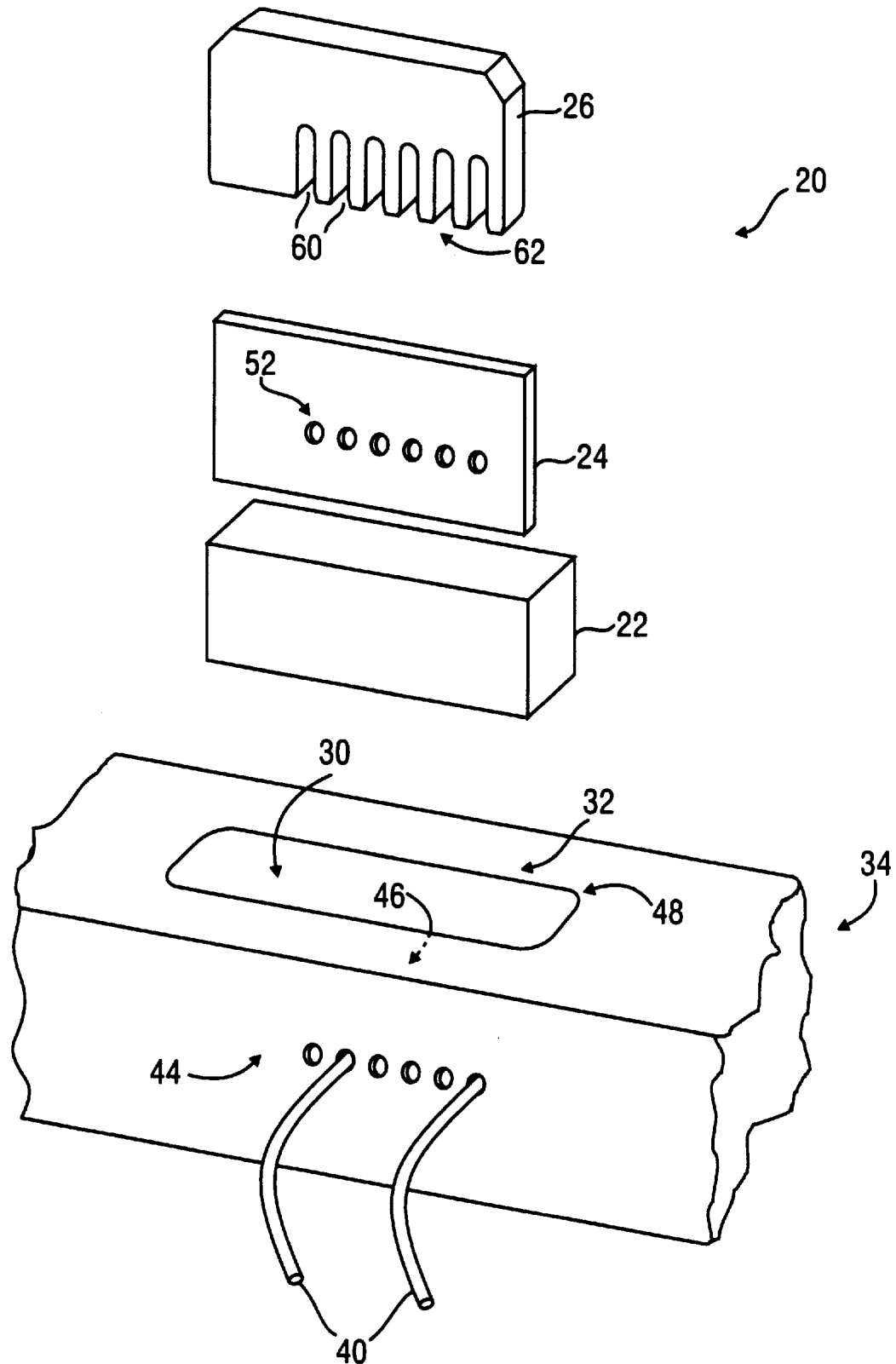
FIG. 1 is an exploded perspective view illustrating an embodiment of a sealing device of the present invention.
Figure 2:
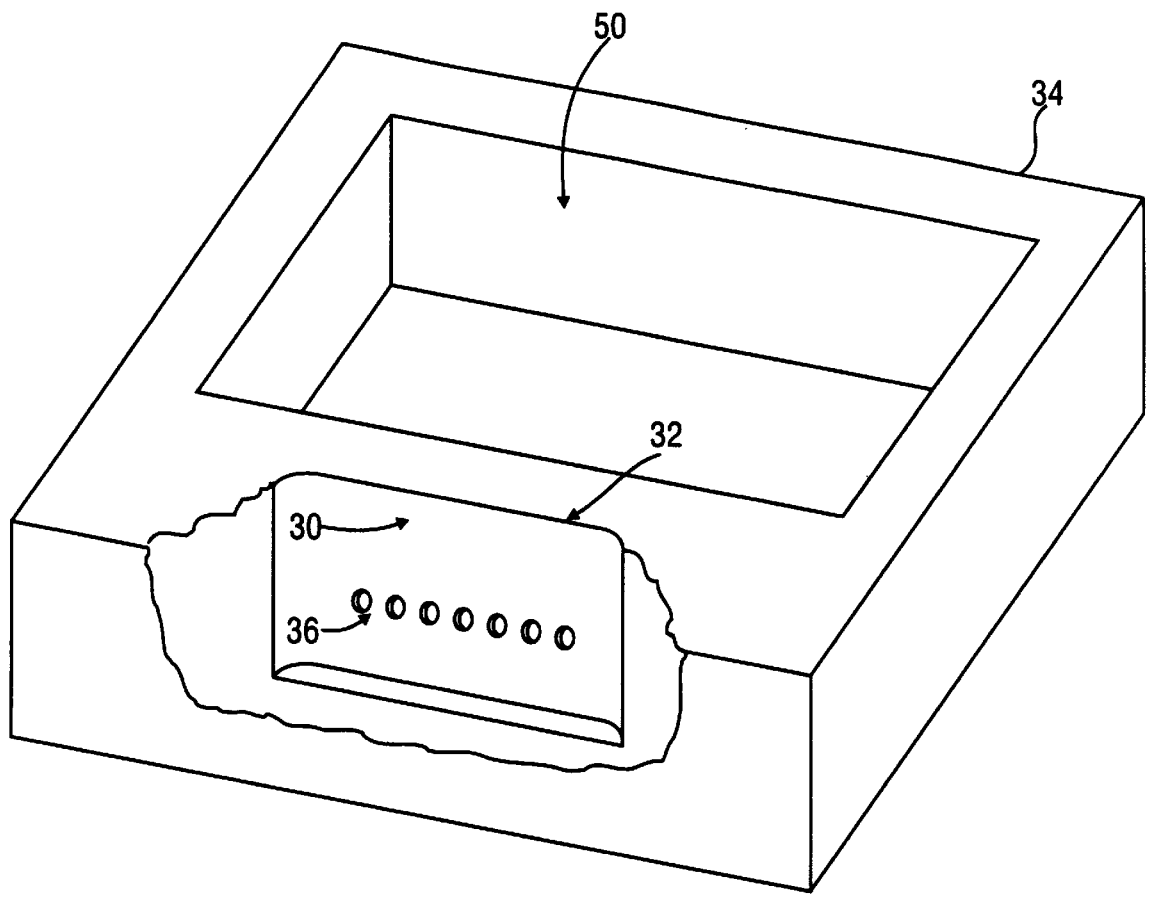
FIG. 2 is a perspective view illustrating the portion of the component to be sealed.

Referring to FIG. 1, the sealing device 20 comprises a layer of sealant 22, a sealant support or backing 24 which supports the sealant 22, and a compression or pressure member 26. The sealing device 20 is used to seal an internal surface 30 inside a cavity 32 of a hollow member 34. As best seen in FIG. 2, the internal surface 30 includes at least one aperture 36 through which at least one substrate may extend. In the embodiment shown in FIGS. 1 and 2, the internal surface 30 has an aperture pattern with an array of generally circular apertures 36 for receiving wires or pins or other similar substrates 40. The wires or pins 40 extend through a similar set of apertures 44 provided through an opposite interior surface or support surface 46 inside the cavity 32 of the hollow member 34, across the cavity 32, and through the apertures 36 in the internal surface 30. The sealing device 20 seals the internal surface or sealing surface 30 and the wires or pins 40 extending there through.

The hollow member 34 may be, for example, a plug or cap, a pipe, or an electrical housing such as a connector body, or a multiconductor connector body, such as those described in U.S. Pat. No. 4,923,405 to Munsterman et al. and the above-mentioned U.S. Pat. No. 4,875,870 to Hardy et al., the entire disclosures of which are incorporated by reference herein for all purposes. In these applications, the enclosure 50 as illustrated in FIG. 2, adjacent the wall forming the internal surface 30 through which the substrate 40 extends, is sealed and protected from external elements such as environmental influences. This invention is particularly useful for sealing the wire entry surface of a CATV tab box which has the configuration shown in FIGS. 1 and 2. In addition, various other aperture patterns 36 in the internal surface 30 for receiving different substrates 40 may be utilized for a wide variety of different applications, as will be seen in the discussion below.

Figure 3:
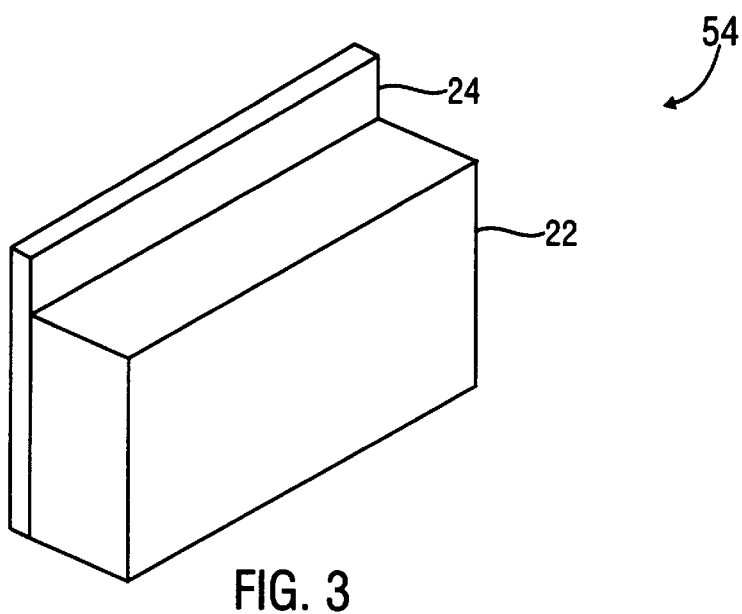
FIG. 3 is a perspective view illustrating a self-supporting sealing member of the present invention.

Referring to FIG. 1, the layer of sealant 22 is to be inserted into the cavity 32 through its opening 48 and positioned adjacent the internal surface 30. The layer of sealant 22 may comprise any sealing material, but desirably includes a gel. The gel preferably has a Voland hardness of about 1 to about 500 g, more preferably about 5 to about 250 g, and most preferably about 6 to about 200 g. The gel has an ultimate elongation of at least about 50%, preferably at least about 100%, more preferably at least about 400%. The elongation is measured according to the procedures of ASTM D638. The Voland hardness, stress relaxation, and tack may be measured using a Voland-Stevens Texture analyzer Model LFRA having a 1000 g load cell, a 5 gram trigger, and a ¼ inch (6.35 mm) ball probe, as described in U.S. Pat. No. 5,079,300 to Dubrow et al., the entire disclosure of which is incorporated herein by reference for all purposes. For measuring the hardness of a gel, a 20 ml glass scintillating vial containing 13 g of gel is placed in the Voland-Stevens Texture analyzer and the stainless steel ball probe is forced into the gel at a speed of 0.2 mm per second to a penetration distance of 4.0 mm. The Voland hardness value of the gel is the force in grams required to force the ball probe at that speed to penetrate or deform the surface of the gel to the specified 4.0 mm, which is measured from the trigger load point. In the example given above, for instance, the specified 4.0 mm is measured from the point where the loading is at the 5 gram trigger. The Voland hardness of a particular gel may be directly correlated to the ASTM D217 cone penetration hardness and the procedure and a correlation is shown in FIG. 3 of U.S. Pat. No. 4,852,646 to Dittmer et al., the entire disclosure of which is incorporated herein by reference for all purposes.

The gel is preferably a fluid-extended polymer composition. The polymeric component can be, for example, a silicone, polyorgano siloxane, polyurethane, polyurea, styrene-butadiene, styrene-isoprene, styrene-ethylene, propylene-styrene and/or styrene ethylene butylene-styrene block copolymers. The gels may be formed from a mixture of such polymers. The layer of gel may comprise a foam impregnated with the gel. Examples of gels can be found in U.S. Pat. No. 4,600,261 to Debbaut, U.S. Pat. No. 4,690,831 to Uken et al., U.S. Pat. No. 4,716,183 to Gamarra et al., U.S. Pat. No. 4,777,063 to Dubrow et al., U.S. Pat. No. 4,864,725 to Debbaut et al., U.S. Pat. No. 4,865,905 to Debbaut et al., U.S. Pat No. 5,079,300 to Dubrow et al, U.S. Pat. No. 5,104,930 to Rinde et al and International published patent application Nos. 86/01634 to Toy et al., and WO 88/00603 to Francis et al. The gel may be impregnated in a reinforcing sheet such as a film or a matrix such as a foam or fabric. Gel impregnated in a matrix is disclosed in U.S. Pat. No. 4,865,905 to Uken. The gel may be processed, for example, by shearing a cured gel, as described in U.S. Pat. No. 5,418,001 to Uken. The entire disclosures of all of the above are incorporated herein by reference for all purposes.

In the embodiment shown in FIG. 1, the layer of sealant 22 has generally uniform thickness, although variations in thickness are acceptable in other embodiments and dictated by the particular application. For instance, the sealant 22 may be thicker in the regions through which the substrate 40 is to be inserted or may conform to the configuration of the internal surface of the cavity. Slits or openings (not shown) corresponding to the apertures 36 on the internal surface 30 may be provided through the sealant 22 to facilitate insertion of the substrate 40 there through, but are not necessary. The slits and openings, if provided, are desirably somewhat smaller than the size of the substrate 40 so that the sealant 22 is maintained in sealing contact with the substrate 40.

Referring to FIG. 1, the backing or sealant support 24 is generally a plate-like or sheet-like member of approximately the same configuration and dimensions as the cross section of the cavity 32 of the hollow member 34 with which it is to be used. The backing 24 may be made of a relatively rigid material such as polycarbonate, polyacrylate, metal (when an insulating material is not required), polyester, nylon, or the like. The backing 24 may also be made of a resilient elastomeric material, such as rubber, silicone, fluorosilicone, polyurethane, ethylene/propylene copolymer or terpolymer rubber, thermoplastic elastomers, or the like. In the embodiment shown, the backing 24 is preferably made of a semi-rigid material, such as Mylar, which has a rigidity that falls between that of a rigid material such as metal and that of a resilient material such as rubber. The backing 24 includes apertures 52 similar in size and pattern to the apertures 36 on the internal surface 30 to provide entry/exit sites for the substrate(s) 40. The apertures 52 may not be necessary if the backing 24 is made of a sufficiently resilient material and has a sufficiently small thickness so that the substrate(s) 40 can easily penetrate through the backing 24. Advantageously, the apertures 52 of the backing 24 are substantially aligned with the apertures 36 on the internal surface 30 when the backing 24 is inserted into the cavity 32 through the opening 48.

In a preferred embodiment, the layer of sealant 22 and backing 24 are preformed into a sealing member 54 that is a self-supporting article comprising a layer of sealant 22 supported on a backing 24, as illustrated in FIG. 3. The sealing member 54 can be prepared by placing a layer of sealant 22 over a backing 24. In embodiments in which the sealant 22 is a gel, the adhesive characteristics of the gel may cause the gel layer 22 to be adhered to an adjacent backing 24 to form a self-supporting article. In some embodiments, the sealing member 54 comprises a laminate of sealant 22 on the backing 24 to form a self-supporting article, which may be formed by cold lamination. The formation of a self-supporting sealing member 54 facilitates easy and precise positioning of the layer of sealant 22 in the cavity 32. The backing 24 is desirably the same in area as the layer of sealant 22, and more desirably larger in area than the layer of sealant 22 as shown in FIG. 3.

Figures 4A, 4B:
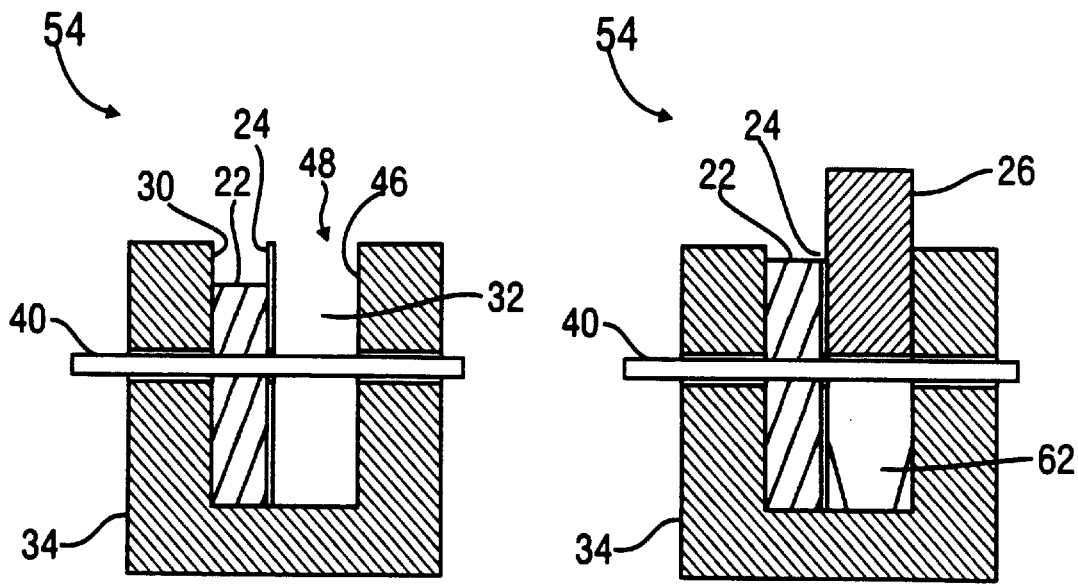
FIG. 4a is a cross-sectional view illustrating the self-supporting sealing member of FIG. 2 positioned in a cavity with the insertion of a substrate.
FIG. 4b is a cross-sectional view illustrating the compression of the self-supporting sealing member of FIG. 4a by the insertion of a compression member.

In use, the sealing member 54 is inserted through the opening 48 into the cavity 32 with the layer of sealant 22 positioned transversely across the internal surface 30. After the sealing member 54 is positioned inside the cavity 32, one or more substrates 40 are inserted through the apertures 44 of the support surface 46 and the apertures 52 provided in the backing 24, through the layer of sealant 22 (via the slits or openings if provided there through), and through the apertures 36 of the internal surface 30 to be sealed, as shown in FIG. 4a. The layer of sealant 22 is disposed adjacent the internal surface 30, while the backing 24 is spaced from the support surface 46. The backing 24 is advantageously supported movably in the cavity 32 in the general direction of the substrate(s) 40. The internal surface 30 to be sealed is also referred to as the inner entry surface or ingress wall surface for entry of the substrate(s) 40, and the support surface 46 as the inner exit surface or egress wall surface for exit of the substrate(s) 40.

To seal the internal surface 30 and substrate(s) 40, a force or pressure is applied to the backing 24 and transferred to the layer of sealant 22 to maintain the sealant 22 in sealing contact with the internal surface 30 and substrate(s) 40. The applied force or pressure desirably is substantially uniform over the layer of sealant 22 to ensure substantially uniform sealing contact over the internal sealing surface 30 and the substrate(s) 40. If the backing 24 is substantially rigid, a finite number of discrete forces distributed generally evenly over the surface of the backing 24 will produce a generally uniform pressure on the layer of sealant 22. If the backing 24 is semi-rigid or resilient, it is desirable to apply a generally uniform pressure over the surface of the backing 24 to produce a generally uniform pressure on the layer of sealant 22.

One way of generating a uniform pressure on the backing 24 is by inserting a compression member 26 of a sufficient size through the opening 48 into the cavity 32 between the backing 24 and the support surface 46, as shown in FIG. 4b. The compression member 26 is compressed between the support surface 46 and the backing 24, thereby generating a compressive force on the layer of sealant 22 against the internal surface 30 to maintain a sealing contact. The compressive force is produced as a result of a reaction force generated at the support surface 46 on the compression member 26 in response to the deformation of the layer of sealant 22 caused by the insertion of the compression member 26 into the cavity 32. The surface of the compression member 26 that contacts the backing 24 substantially covers the entire surface area of the backing 24, such that the compressive force is substantially distributed evenly over the surface of the backing 24 and transferred to the layer of sealant 22.

When the layer of sealant 22 is compressed, it will deform against the internal surface 30. The sealant 22 is desirably constrained along a substantial portion of its border or edge by the walls of the cavity 32. In the embodiment shown in FIG. 4b, the layer of sealant 22 is constrained in all directions except along a portion of its border facing the opening 48 of the cavity 32 which expands in the direction toward the opening 48. The layer of sealant 22 is desirably configured such that the area of the surface is less than or approximately equal to the area of the surface of the backing 24 in the compressed state as shown in FIG. 4b.

Advantageously, if it is necessary to change or remove the substrate(s) 40 or insert a new substrate(s) 40, the compression member 26 is first removed from the cavity 32. The pressure in the layer of sealant 22 is released so that it will be easy to manipulate the substrate(s) 40 and avoid damaging the sealant 22 which may occur if the substrate(s) 40 is removed or inserted while the sealant 22 is under relatively high pressure. After the changes to the substrate(s) 40 is made, the compression member 26 can be reinserted into the cavity 32 to compress the sealing member 54 in sealing contact with the internal surface 30 and substrate(s) 40.

The compression member 26 of this embodiment is best illustrated in FIG. 1. The configuration of the compression member 26 resembles generally that of the spacing in the cavity 32 defined between the backing 24 and the support surface 46. The compression member 26 desirably is substantially noncompressible so that accurate sealing pressure can be produced in the sealant 22 by the displacement of the backing 24 caused by insertion of the compression member 26. The compression member 26 may be made of a variety of materials, such as metal and polycarbonate. The thickness of the compression member 26 is preferably larger than the depth of the spacing provided in the cavity 32 when the layer of sealant 22 is not in the compressed state, so that the compression member 26 produces a compressive force on the sealing member 54 when inserted.

The compression member 26 advantageously includes at least one cutout or slot 60 in the direction of insertion to fit over the substrate(s) 40 to avoid hitting against the substrate (s) 40. As a result, the substrate(s) 40 will not be disconnected or otherwise damaged by the compression member 26 during the insertion and removal of the compression member 26. FIG. 1 shows an array of cutouts 60 that correspond to the pattern of apertures 36 of the internal surface 30. The compression member 26 in such an embodiment is a comb-like member which avoids the substrate(s) 40 but is still capable of exerting a generally uniform pressure on the backing 24. As shown in FIG. 4b, the compression member 26 is desirably large enough to extend beyond the opening 48 of the cavity 32 when inserted so that it can be easily grasped and pulled for removal from the cavity 32 when desired. In another embodiment, the compression member 26 is integral with a lid (not shown) for the hollow member 34 which is used to cover the enclosure 50. The compression member 26 in such an embodiment is built into the lid for ease of use, and will not be misplaced.

As seen in FIGS. 1 and 4b, the front edge 62 of the compression member 26 is advantageously tapered to facilitate easy insertion of the compression member 26 into the cavity 32. As discussed above, the compression member 26 may be made of a variety of materials, such as metal and polycarbonate. The surfaces of the compression member 26 are desirably low friction to facilitate insertion into and removal from the cavity 32. Similarly, the surface of the backing 24 in contact with the compression member 26 is also desirably low friction. In addition, the semi-rigid nature of the backing 24 facilitates smooth insertion of the compression member 26 in one stroke. If the backing 24 is too resilient, it may deform in the direction of the travel of the compression member 26 toward the bottom of the cavity 32 during insertion so much as to impede the full insertion of the compression member 26. If the backing 24 is too rigid, it may be necessary to jostle or twitch the compression member 26 with difficulty to insert it into the cavity 32. The insertion of the compression member 26 may also be facilitated by an inclined support surface 46' as that illustrated in FIGS. 5a and 5b.

Figures 5A, 5B:
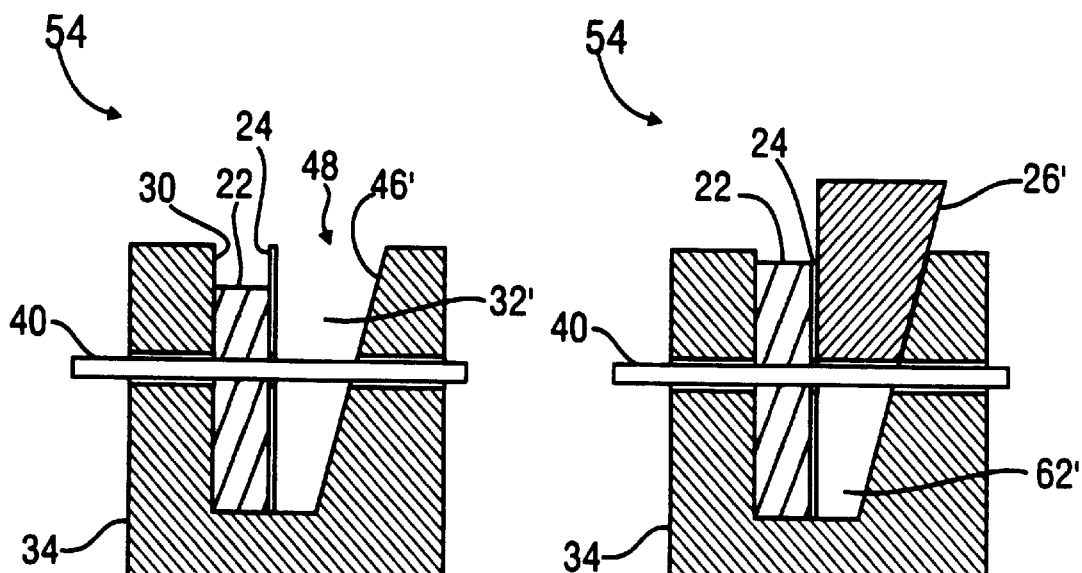
FIG. 5a is a cross-sectional view illustrating the self-supporting sealing member of FIG. 2 positioned in a different cavity with the insertion of a substrate.
FIG. 5b is a cross-sectional view illustrating the compression of the self-supporting sealing member of FIG. 4a by the insertion of another embodiment of a compression member.

As seen in FIGS. 5a and 5b, the shape of the cavity 32' can be different from the generally rectangular cavity 32 shown in FIGS. 4a and 4b. For instance, in other embodiments, the internal surface 30 and support surface 46 may be vertical or angled relative to the opening 48 of the cavity 32. The support surface 46 will generally support the compression member 26 in compression against the sealing member 54 and internal surface 30 as long as the two surfaces are nonparallel to the opening 48 of the cavity 32. Furthermore, the internal surface 30 and support surface 46 may be curved or flat. The shape and dimensions of the cavity 32 dictate to a large extent the shapes and dimensions of the sealing member 54 and compression member 26. For instance, the comparison member 26' in FIG. 5b has a shape and dimensions that are governed by the shape and dimensions of the cavity 32'.

The dimensions of the components of the sealing device 20 are also determined based on factors such as the materials used and desired pressure for sealing. For instance, if the rigidity of the backing 24 is high, its thickness can be relatively small and still be sufficient to support the layer of sealant 22 and distribute the force applied by the compression member 26 substantially evenly on the sealant 22. The thickness of the layer of sealant 22 may be determined by the desired sealing pressure as generated by the amount of compression and deformation of the sealant needed. These factors also affect the selection of the thickness for the compression member 26. It is understood that, given this disclosure, a person of ordinary skill in the art can determine the proper materials, shapes, and sizes of the sealant 22, backing 24, and compression member 26, to achieve the desired sealing without undue experimentation.

As mentioned above, the pattern of cutouts 60 of the compression member 26 is chosen to complement the aperture pattern 36 of the internal surface 30 for accommodating the substrate(s) 40. Another embodiment of the compression member 66 as shown in FIGS. 6a and 6b aptly illustrates this feature of the compression member 66. The cavity 68 in this embodiment has an opening 70 oriented to the side. The substrate is a ribbon cable 72, but it can be another similar substrate oriented generally as shown in the direction of travel for the compression member 66. The compression member 66 has a cutout or slot that fits over the ribbon cable 72 when it is inserted into the cavity 68 to compress the backing 74 and sealant 76 in sealing contact with the internal sealing surface. The orientation of the compression member 66 is advantageously adjusted in this embodiment to accommodate the ribbon cable 72 to produce the surface contact with the backing 74 for distributed pressure loading on the backing 74 and sealant 76.

Figure 7B:
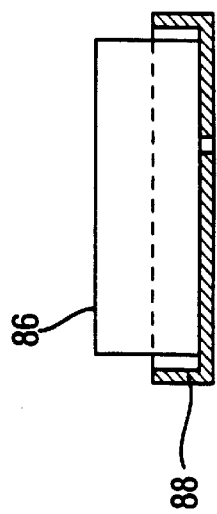
Figure 7A:
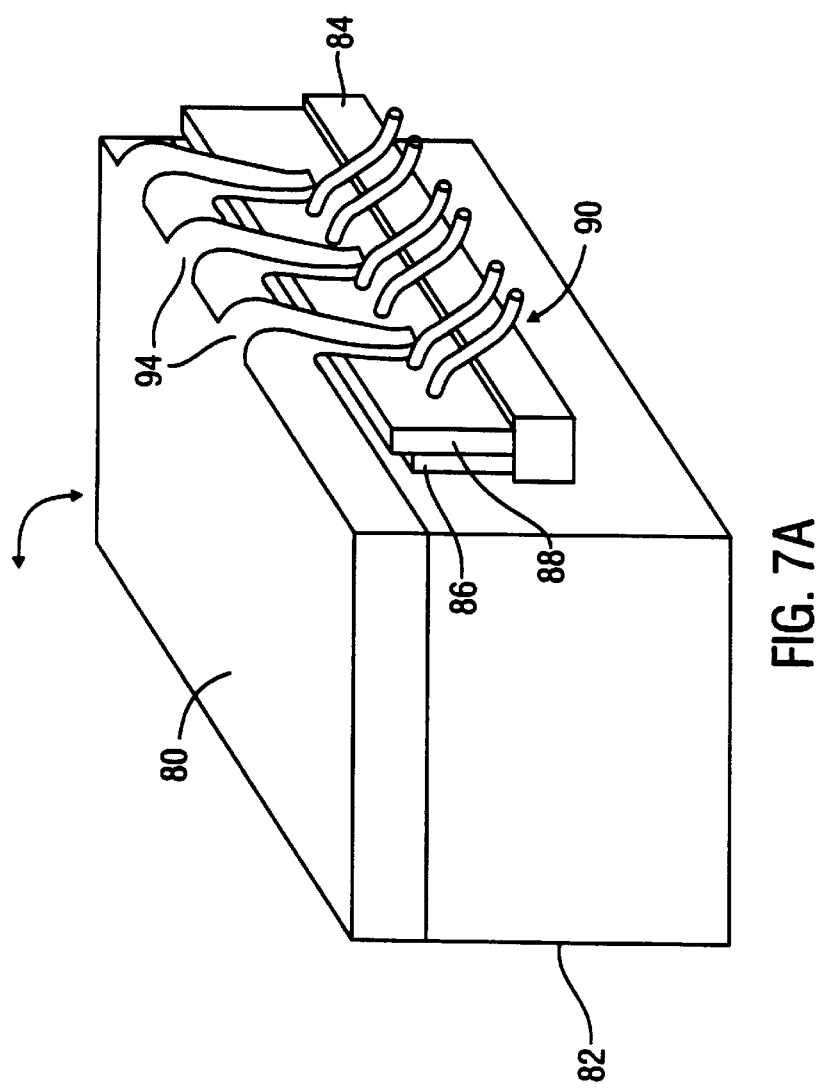
FIG. 7a is a perspective view illustrating another embodiment of the sealing device which uses the hinged cover of a box as part of the compression member.

There are other ways to exert a force on the sealing member 54 for sealing. One device employing a hinged cover 80 of a box 82 is shown in FIGS. 7a and 7b. The box 82 includes a support ledge 84 that supports the layer of sealant 86 and backing 88. The backing 88 desirably has the shape of a dish with a cavity that partly encloses the layer of sealant 86. The edges or borders of the layer of sealant 86 are advantageously constrained substantially by the backing 88. Substrates in the form of wires 90 extend through the backing 88 and sealant 86 into the box 82. The hinged cover 80 includes a force member shown in the form of fingers 92 extending from the edge of the hinged cover 80. When the hinged cover 80 is closed, the fingers 92 extend between the wires 90 and exert forces on the backing 88 to press the layer of sealant 86 in sealing contact with the surface on the side of the box 82. The fingers 92 are disengaged from the backing 88 when the hinged cover 80 is opened. The force member 92 is built into the hinged cover 80 for ease of use, and will not be misplaced. In a preferred embodiment, the backing 88 is substantially rigid such that only one or a few fingers 92 are sufficient to apply a force on the backing 88 so as to produce a generally uniform pressure loading on the layer of sealant 86.

Figure 8:
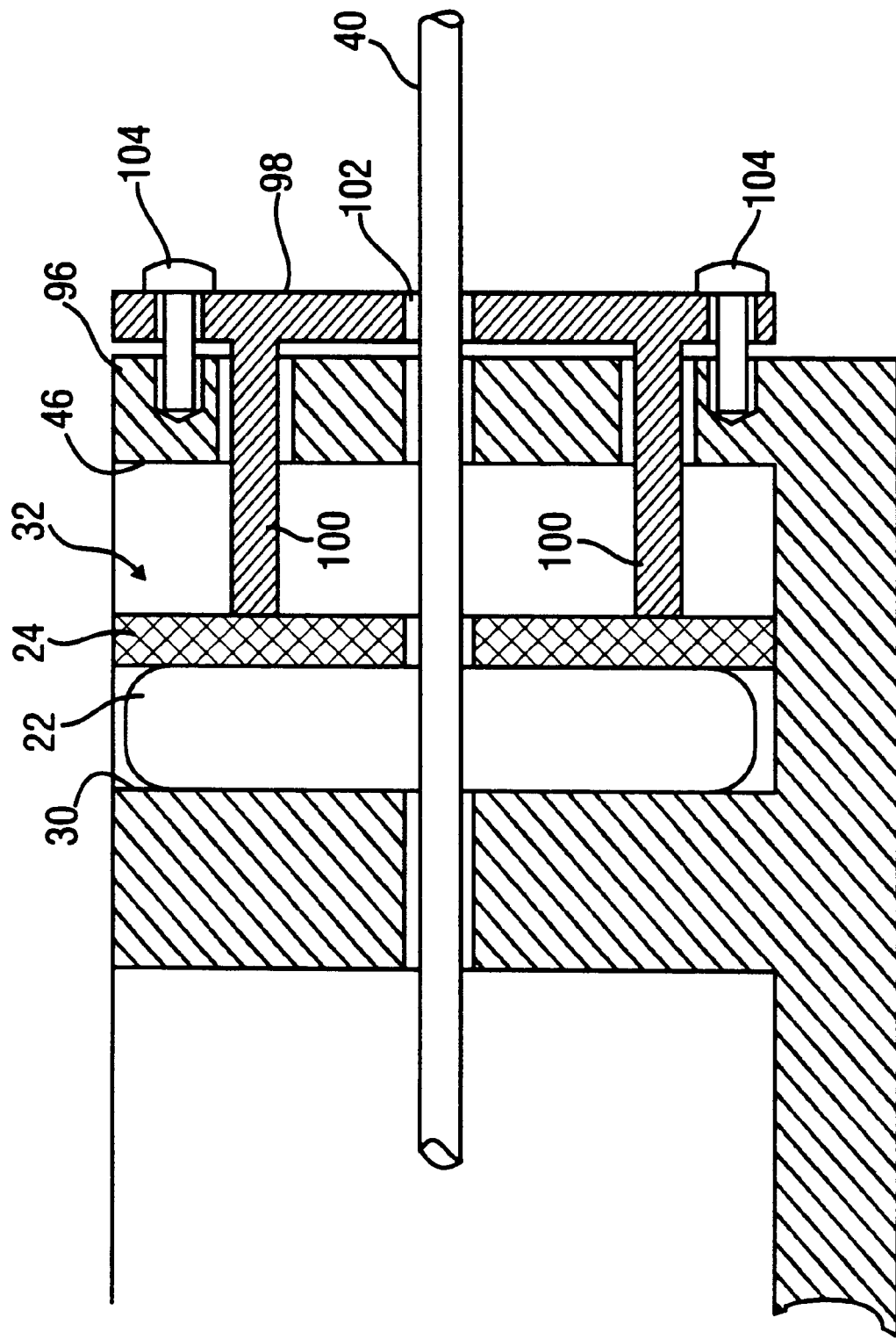
FIG. 8 is a cross-sectional view illustrating yet another embodiment of the sealing device.

Yet another embodiment of the sealing device is shown in FIG. 8. Because many components in this embodiment are the same as those in the embodiment of FIG. 1, like reference numbers are used for like components in the following discussion. The layer of sealant 22 is disposed adjacent the internal sealing surface 30 and supported by the backing 24 that is spaced from the support surface 46 of the external wall 96 of the hollow member 34 which partly defines the cavity 32. Instead of a compression member, a mountable force member 98 is mounted on the external wall 96 and has legs 100 that extend through the external wall 96 and the support surface 46, across the cavity 32, against the backing 24. The mountable force member 98 desirably has apertures 102 through which the substrate(s) 40 extends. The legs 100 are sufficiently long to exert adequate force on the backing 24, and are desirably distributed generally evenly over the surface of the backing 24 to produce a substantially even pressure distribution on the layer of sealant 22. In a preferred embodiment, the backing 24 is substantially rigid so that only one or a few legs 100 are sufficient to produce the generally uniform loading on the layer of sealant 22. The force member 98 can be mounted to the external wall 96 by fasteners 104 as shown or other similar means.

It will be understood that the above-described arrangements of apparatus and the methods therefrom are merely illustrative of applications of the principles of this invention and many other embodiments and modifications may be made without departing from the spirit and scope of the invention as defined in the claims.

What is claimed is:

1. A device for sealing an inner entry surface of a cavity and at least one substrate extending from an inner exit surface of said cavity across said cavity through said inner entry surface, said device comprising:
  a layer of sealant disposed adjacent said inner entry surface;
  a backing movably supported in said cavity, spaced from said inner exit surface, and disposed adjacent said layer of sealant, said backing including at least one opening through which said at least one substrate extends; and
  a compression member insertable into said cavity between said backing and said inner exit surface, said compression member being insertable while said at least one substrate extends through said backing and said inner exit surface and including at least one cutout which fits over said at least one substrate during insertion of said compression member, said backing moving toward said inner entry surface and compressing said layer of sealant against said inner entry surface upon insertion of said compression member into said cavity.

2. The device of claim 1, wherein said compression member is removable from said cavity to release compression of said layer of sealant with said at least one cutout dissociating from said at least one substrate.

3. The device of claim 1, wherein said backing comprises a sheet adhered to said layer of sealant and forming a self-supporting article with said layer of sealant.

4. The device of claim 1, wherein said layer of sealant has at least one aperture aligned with said at least one opening of said backing.

5. The device of claim 1, wherein said layer of sealant is substantially constrained along a portion of its edges by said cavity upon insertion of said compression member into said cavity.

6. The device of claim 1, wherein said layer of sealant is generally uniform in thickness.

7. A sealing assembly for sealing an internal surface of a hollow member having an aperture pattern for receiving at least one substrate extending across said hollow member, said internal surface oriented nonparallel to an open end of said hollow member, said sealing assembly comprising:
  a sealing member having a layer of sealant supported on a support which includes an aperture pattern corresponding to said aperture pattern of said internal surface, said layer of seaant disposed between said support and said internal surface and oriented parallel to said support and said internal surface and nonparallel to the open end of said hollow member; and
  a means insertable through said open end of said hollow member for applying force to said support to maintain said layer of sealant in sealing contact with said internal surface, said means being insertable while said sealing member is disposed between said support and said internal surface.

8. The sealing assembly of claim 7, wherein said force is generally uniformly distributed over said support.

9. The sealing assembly of claim 7, wherein said means comprises a generally noncompressible member having a sufficient size to be supported in and constrained by said hollow member to bear upon said sealing member against said internal surface.

10. The sealing assembly of claim 9, wherein said noncompressible member includes an array of slots corresponding to said aperture pattern of said support to avoid interfering with said at least one substrate during insertion of said noncompressible member into and removal from said hollow member.

11. The sealing assembly of claim 7, wherein said substrate comprises a ribbon cable.

12. A preformed sealing member for sealing an internal surface skewed relative to an open end of a hollow member, said preformed sealing member comprising a self-supporting article having a layer of sealant with a contact surface adhered to a front surface of a sealant support, wherein said front surface of said sealant support is larger in area than said contact surface of said layer of sealant, wherein said sealant support includes a low friction back surface.

13. The preformed sealing member of claim 12, wherein said sealant support comprises a semi-rigid sheet having at least one opening for receiving a substrate through said preformed sealing member.

14. The preformed sealing member of claim 12, wherein said sealant is a gel.

15. A method of sealing an ingress wall surface of a cavity and at least one substrate extending from an egress wall surface of said cavity across said cavity through at least one hole in said ingress wall surface, said method comprising the steps of:

applying a layer of sealant on a surface of a backing, which has at least one aperture, to form a sealing article;

positioning said sealing article inside said cavity with said layer of sealant adjacent said ingress wall surface and said at least one aperture generally aligned with said at least one hole in said ingress wall surface;

inserting said at least one substrate from said egress wall surface through said at least one aperture, said layer of sealant, and said at least one hole in said ingress wall surface; and interposing a pressure member between said egress wall surface and said backing to apply pressure on said layer of sealant in sealing contact against said ingress wall surface, interposing said presure member after positioning said sealing article.

16. The method of claim 15, wherein said step of applying comprises joining said layer of sealant in adhesion to said surface of said backing which has sufficient rigidity to form a self-supporting sealing article with said layer of sealant.

17. The method of claim 15, wherein said step of positioning comprises placing said sealing article with said layer of sealant spaced from said ingress wall surface to prevent contact between said layer of sealant and said ingress wall surface during movement of said layer of sealant relative to said ingress wall surface.

18. The method of claim 15, wherein said pressure member comprises at least one cutout that fits over said at least one substrate during said step of interposing.

19. The method of claim 15, further comprising the steps of:

removing said pressure member;

withdrawing said at least one substrate from said at least one hole in said ingress wall surface, said layer of sealant, said at least one aperture, and said egress wall surface;

inserting at least one other substrate from said egress wall surface through said at least one aperture, said layer of sealant, and said at least one hole in said ingress all surface; and interposing said pressure member between said egress wall surface and said backing to apply pressure on said layer of sealant in sealing contact against said ingress wall surface.

20. A method of sealing an ingress wall surface of a cavity and at least one substrate extending from an egress wall surface of said cavity across said cavity through at least one hole in said in gress wall surface, said method comprising the steps of:

applying a layer of sealant on a surface of a backing, which has at least one aperture, to form a sealing article;

positioning said sealing article inside said cavity with said layer of sealant adjacent said ingress wall surface and said at least one aperture generally aligned with said at least one hole in said ingress wall surface;

inserting said at least one substrate from said egress wall surface through said at least one aperture, said layer of sealant, and said at least one hole in said ingress wall surface; and interposing a pressure member between said egress wall surface and said backing to apply pressure on said layer of sealant in sealing contact against said ingress wall surface, wherein said step of interposing comprises wedging said pressure member having a shape and a size to apply said pressure that is substantially uniformly distributed over said layer of sealant.

* * * * *